United States Patent
Rose et al.

(10) Patent No.: US 11,278,986 B2
(45) Date of Patent: Mar. 22, 2022

(54) REPAIRING HOLES CREATED IN COMPONENTS DURING BOBBIN FRICTION STIR WELDING

(71) Applicant: The Boeing Company, Chicago, IL (US)

(72) Inventors: Scott A. Rose, Wentzville, MO (US); Sean M. Thuston, High Ridge, MO (US); Brian J. Martinek, Troy, MO (US); John A. Baumann, St. Charles, MO (US)

(73) Assignee: The Boeing Company, Chicago, IL (US)

( * ) Notice: Subject to any disclaimer, the term of this patent is extended or adjusted under 35 U.S.C. 154(b) by 172 days.

(21) Appl. No.: 16/703,669

(22) Filed: Dec. 4, 2019

(65) Prior Publication Data
US 2020/0101559 A1 Apr. 2, 2020

Related U.S. Application Data

(63) Continuation of application No. 15/784,506, filed on Oct. 16, 2017, now Pat. No. 10,532,425.

(51) Int. Cl.
*B23K 20/12* (2006.01)
*F16B 5/08* (2006.01)

(52) U.S. Cl.
CPC ........ *B23K 20/128* (2013.01); *B23K 20/1225* (2013.01); *F16B 5/08* (2013.01)

(58) Field of Classification Search
CPC ............... B23K 20/122; B23K 20/129; B23K 20/1295; B23K 20/128; B23K 20/12; B23K 20/1265; B23K 20/1225
See application file for complete search history.

(56) References Cited

U.S. PATENT DOCUMENTS

| | | | |
|---|---|---|---|
| 5,971,252 A | 10/1999 | Rosen et al. | |
| 5,975,406 A | 11/1999 | Mahoney et al. | |
| 6,213,379 B1 | 4/2001 | Takeshita et al. | |
| 6,230,958 B1 | 5/2001 | Coletta et al. | |
| 7,281,647 B2 | 10/2007 | Stol et al. | |
| 10,532,425 B2 * | 1/2020 | Rose | B23K 20/124 |
| 2016/0136754 A1 | 5/2016 | Matlack et al. | |
| 2016/0250727 A1 | 9/2016 | Foucher et al. | |
| 2019/0111513 A1 | 4/2019 | Rose et al. | |

OTHER PUBLICATIONS

U.S. Appl. No. 15/784,506, Notice of Allowance dated Sep. 5, 2019, 9 pgs.

* cited by examiner

*Primary Examiner* — Daniel J Wiley
(74) *Attorney, Agent, or Firm* — Kwan & Olynick LLP

(57) ABSTRACT

Disclosed herein are systems, methods, and devices for repairing holes in weld seams created by bobbin friction stir welding tools. A hole may be created when a welding tool or, more specifically, a pin of the tool is removed or otherwise extracted from a weld seam created by the tool. The method may involve inserting a plug (e.g., a rivet) into the hole, reshaping the plug in the hole (e.g., riveting) thereby securing the plug in the component, and creating another weld seam through the plug thereby consuming the plug. In some embodiments, the hole may be reshaped prior to inserting the plug. For example, the hole may be drilled out and/or a countersink may be created on one or both ends of the hole. Furthermore, the plug may extend outside of the hole prior to its reshaping and, in some embodiments, even after reshaping.

20 Claims, 13 Drawing Sheets

Changing Parameter(s) of the Hole

REPAIRING HOLES CREATED IN COMPONENTS DURING BOBBIN FRICTION STIR WELDING

CROSS-REFERENCE TO RELATED APPLICATION

This application is a continuation of U.S. patent application Ser. No. 15/784,506, entitled "REPAIRING HOLES CREATED IN COMPONENTS DURING BOBBIN FRICTION STIR WELDING," filed on 16 Oct. 2017, which is incorporated herein by reference in its entirety for all purposes.

BACKGROUND

Manufacturing of various components or, more specifically, components of vehicles (e.g., aircraft, spacecraft, and other motor vehicles) may involve various welding techniques. Such techniques may be used, for example, to provide structural reinforcement amongst parts at joints. One example of a welding technique is friction stir welding, which involves advancing a rotating pin of the weld tool along an interface between two parts thereby creating a weld seam. A specific example of such a technique is bobbin friction stir welding. The rotating pin experiences friction from the welded component causing localizing warming, softening, and intermixing of materials. In some cases, the pin may unintentionally break while creating the seam (e.g., due to the excessive forces acting on the pin) and later extracted leaving a hole. Such holes may not be desirable in some locations.

SUMMARY

Disclosed herein are systems, methods, and devices for repairing holes in weld seams created by bobbin friction stir welding tools. A hole may be created when a welding tool or, more specifically, a pin of the tool is removed or otherwise extracted from a weld seam created by the tool (e.g., when the pin breaks). The method may involve inserting a plug (e.g., a rivet) into the hole, reshaping the plug in the hole (e.g., riveting) thereby securing the plug in the component, and creating another weld seam through the plug thereby consuming the plug. In some embodiments, the hole may be reshaped prior to inserting the plug. For example, the hole may be drilled out and/or a countersink may be created on one or both ends of the hole. Furthermore, the plug may extend outside of the hole prior to its reshaping and, in some embodiments, even after reshaping.

Provided is a method of repairing a hole in a first weld seam of a component. The hole is created by a first bobbin friction stir welding tool. The method comprises a step of inserting a plug into the hole, a step of reshaping the plug, and a step of creating a second weld seam. Prior to the step of reshaping the plug, the length of the plug may be equal or greater than the height of the hole. Furthermore, during the step of inserting the plug, the hole may be a through hole, which is a distinct characteristic of bobbin friction stir welding.

The step of reshaping the plug is performed while the plug is inserted into the hole. The step of reshaping the plug secures the plug inside the hole. The plug is retained in the hole while the second weld seam is created.

The step of creating the second weld seam is performed using a second bobbin friction stir welding tool. The second bobbin friction stir welding tool may be the first bobbin friction stir welding tool. As such, the same tool may be used to create both seams. Alternatively, the second bobbin friction stir welding tool may be another tool, different from the first bobbin friction stir welding tool. The second weld seam passes through the plug secured in the hole, and the plug is consumed during the step of creating the second weld seam.

In some embodiments, the method further comprises a step of removing a pin of the first bobbin friction stir welding tool from the first weld seam. Pin removal may create the hole in the first weld seam. Furthermore, the method may comprises a step of creating the first weld seam using the first bobbin friction stir welding tool.

In some embodiments, the step of removing the pin is performed after the step of creating the first weld seam. For example, the pin of the first bobbin friction stir welding tool may be retained in the component after the step of creating the first weld seam is completed. More specifically, the pin may break off the first bobbin friction stir welding tool while creating the first weld seam. Alternatively, the pin may be retained in the component after the first weld seam is created, e.g., without breaking off the first bobbin friction stir welding tool. More specifically, the pin may stop rotating while contacting the component and being inserted into the first weld seam.

In some embodiments, the step of removing the pin from the component is a part of the step of creating the first weld seam. For example, the first weld seam may not extend to any edge of the component. As the pin is being removed from the component, the hole is being created.

In some embodiments, before the step of inserting a plug, the hole in the first weld seam has a cylindrical shape. Alternatively, the hole in the first weld seam may have an irregular shape, e.g., a shape that is different from the cylindrical shape. The shape of the hole may be changed at a later operation. For example, the hole having an irregular shape may be drilled out to create a cylindrical shape.

In some embodiments, the method further comprises, prior to the step of inserting the plug into the hole, a step of changing one or more parameters of the hole. Some examples of such parameters comprise the diameter of the hole, the shape of the hole, and the height of the hole. For example, the step of changing one or more parameters of the hole may comprise a step of drilling. Furthermore, the step of changing one or more parameters of the hole may comprise a step of creating at least one countersink at one end of the hole.

In some embodiments, prior to the step of reshaping the plug, the length of the plug may be greater than the height of the hole. For example, prior to the step of reshaping the plug, the plug may extend above at least one of two ends of the hole or, more specifically, may extend above each of two ends of the hole.

In some embodiments, the volume of the plug and the volume of the hole are substantially identical. This feature ensures that the second weld seam, when later created, fills all voids that may have existed between the plug and the component. In the same or other embodiments, the material of the plug and the material of the component creating the hole are substantially identical. Prior to reshaping the plug, the plug may comprise a plug head. The plug head may assist with retaining the plug in the hole while creating the second weld seam.

In some embodiments, the step of reshaping the plug comprises one of a step of squeeze plugging or a step of percussion plugging. After the step of reshaping the plug, the length of the plug may be substantially identical as the height of the hole. For example, after the step of reshaping the plug, ends of the plug may coincide with corresponding surfaces of the component. In some embodiments, after the step of reshaping the plug, the hole is substantially filled with the plug. Alternatively, after the step of reshaping the plug, the hole comprises one or more voids. The one or more voids may be removed during the step of creating the second weld seam. In some embodiments, after the step of reshaping the plug, a portion of the plug protrudes outside of the hole.

In some embodiments, the diameter of the pin of the second bobbin friction stir welding tool is substantially similar to the diameter of the pin of the first bobbin friction stir welding tool. More specifically, the second bobbin friction stir welding tool and the first bobbin friction stir welding tool may be the same tool or similar tools. Alternatively, the second bobbin friction stir welding tool may be different from the first bobbin friction stir welding tool. For example, the diameter of the pin of the second bobbin friction stir welding tool is greater than the diameter of the pin of the first bobbin friction stir welding tool.

In some embodiments, the first weld seam and the second weld seam are collinear. Alternatively, the first weld seam and the second weld seam are not collinear, and the second weld seam may intersect the first weld seam at a location of the plug.

In some embodiments, the component comprises a first part and a second part. The first weld seam extends between the first part and the second part. The first weld seam may be a butt joint extending between the first part and the second part. In some embodiments, the component is an aircraft component.

DETAILED DESCRIPTION

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific examples, it will be understood that these examples are not intended to be limiting.

INTRODUCTION

Friction stir welding is a solid-state joining technique that uses a non-consumable tool or, more specifically, a rotating pin to join two parts of a welded component together. The two parts are joined by a welding seam. Specifically, heat is generated by frictional forces caused by the rotating pin. Due to the generated heat, the material is softened and mixed together by the rotating pin. Bobbin friction stir welding (BFSW) is a specific example of friction stir welding, which will now be described in more detail.

Figure 1A:
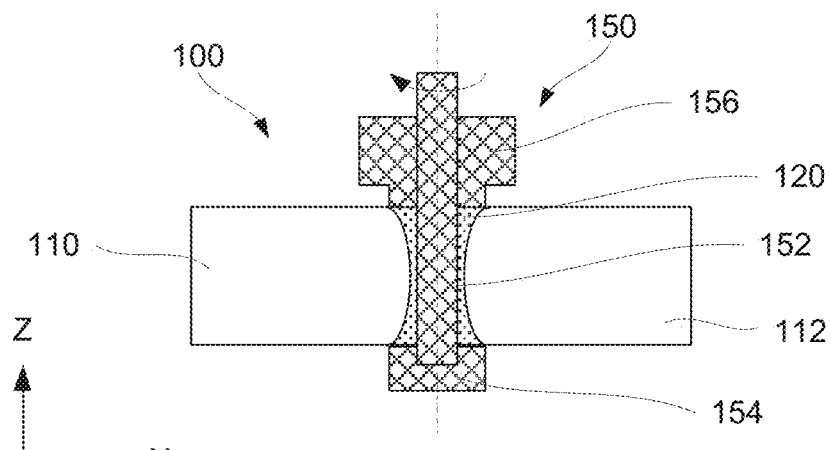
FIG. 1A illustrates a cross-sectional schematic view of a first bobbin friction stir welding tool creating a first weld seam in a component, in accordance with some embodiments.

Referring to FIG. 1A, BFSW tool 150 comprises pin 152, secondary shoulder 154 and main shoulder 156. Pin 152 connects secondary shoulder 154 to main shoulder 156 and controls the gap between secondary shoulder 154 and main shoulder 156.

Secondary shoulder 154 and main shoulder 156 contact opposing surfaces of component 100, while component 100 is being welded. With loads being controlled by secondary shoulder 154 and main shoulder 156 (through pin 152), BFSW tool 150 does not require a backing plate or anvil, unlike conventional FSW tools. The lack of backing plate or anvil makes new joint configurations possible and allows for new applications.

The distance between secondary shoulder 154 and main shoulder 156 can be fixed or be adjustable, in particular, auto-adjustable. The adjustable configuration allows force controlled welds. Furthermore, this adjustable configuration compensates for misalignment between BFSW tool 150 and component 100 and also for dimensional and geometrical tolerances of component 100 without the need for sophisticated machine control systems.

Figure 1B:
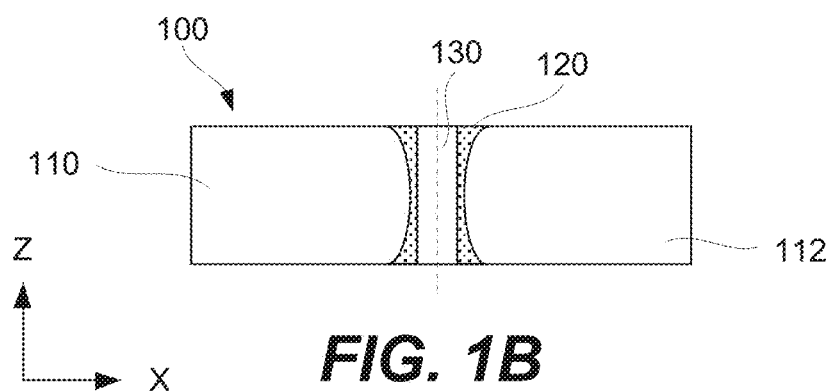
FIG. 1B illustrates a cross-sectional schematic view of the first weld seam in the component with a hole present in the first weld seam, in accordance with some embodiments.

BFSW tool 150 opens the door to new welding applications and allows improving quality of weld seam 120 in comparison to conventional FSW tools. However, BFSW tool 150 still creates holes as a result of retracting pin 152 from weld seam 120 (e.g., when pin 152 breaks). FIG. 1B illustrates a cross-sectional schematic view of weld seam 120 created in component 100. Weld seam 120 has hole 130, the diameter of which may roughly correspond to the diameter of pin 152. As shown in FIG. 1B, weld seam 120 may be wider near surfaces of component 100 because these surfaces come in contact with secondary shoulder 154 and main shoulder 156 of BFSW tool 150. However, away from the surfaces, the stirring is primarily performed by pin 152.

Figure 1C:
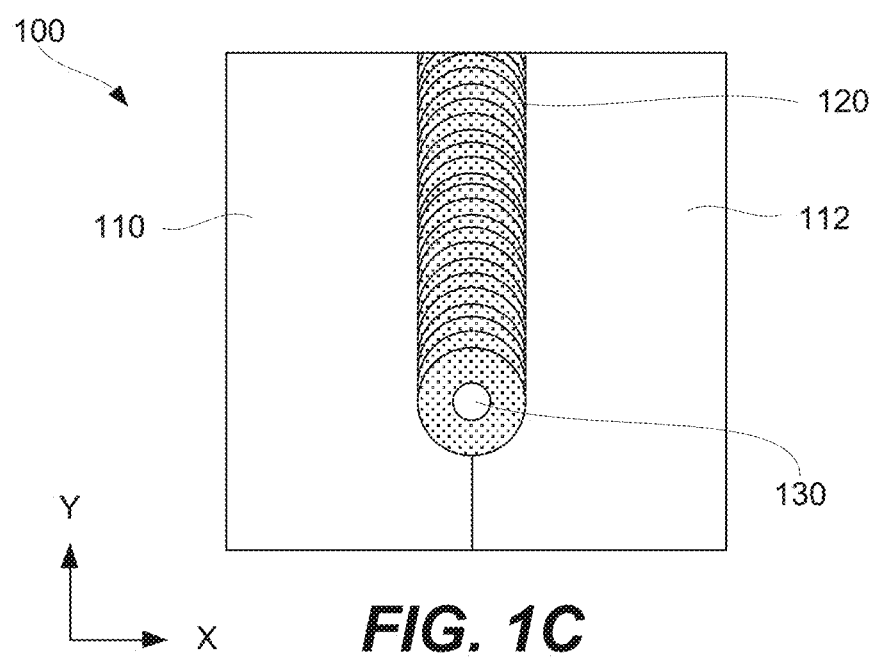
FIG. 1C illustrates a top schematic view of the first weld seam in the component of FIG. 1B, in accordance with some embodiments.

Hole 130, shown in FIGS. 1B and 1C, may be created intentionally (e.g., upon completion of the welding process) or unintentionally (e.g., breaking of pin 152). The shape of hole 130 may depend on the nature of pin retrieval and, in some embodiments, may be cylindrical or irregular. In some instances, hole 130 needs to be repaired as will now be described in more detail. To distinguish weld seam 120 from other weld seams created in component 100, weld seam 120 is referred to as a first weld seam. Furthermore, to distinguish BFSW tool 150 from other BFSW tools. BFSW tool 150 may be referred to as a first BFSW tool.

Processing Examples

Figure 2:
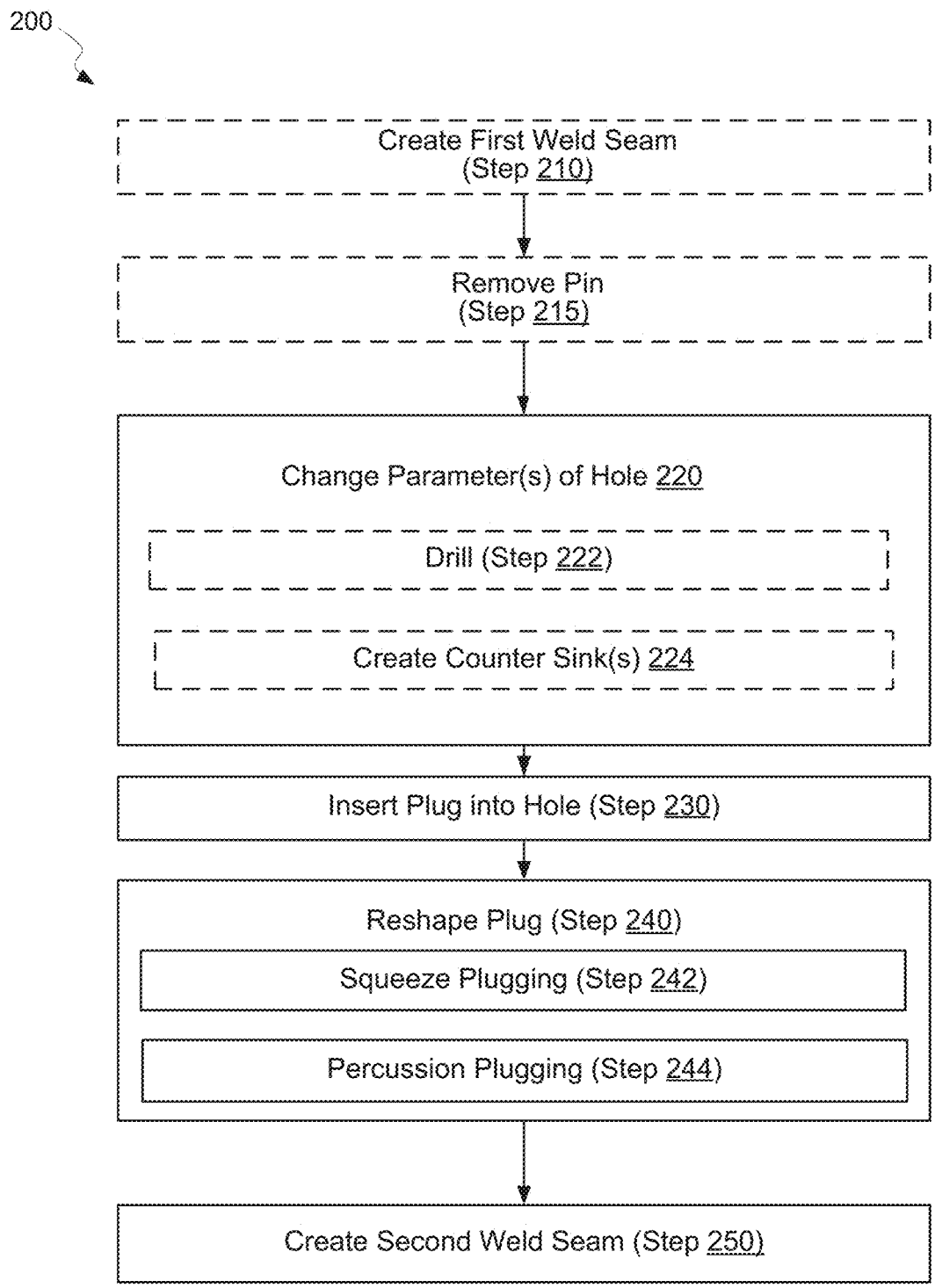
FIG. 2 illustrates a process flowchart corresponding to a method of repairing the hole in the first weld seam of the component shown in FIGS. 1B and 1C, in accordance with some embodiments.
Figure 3A:
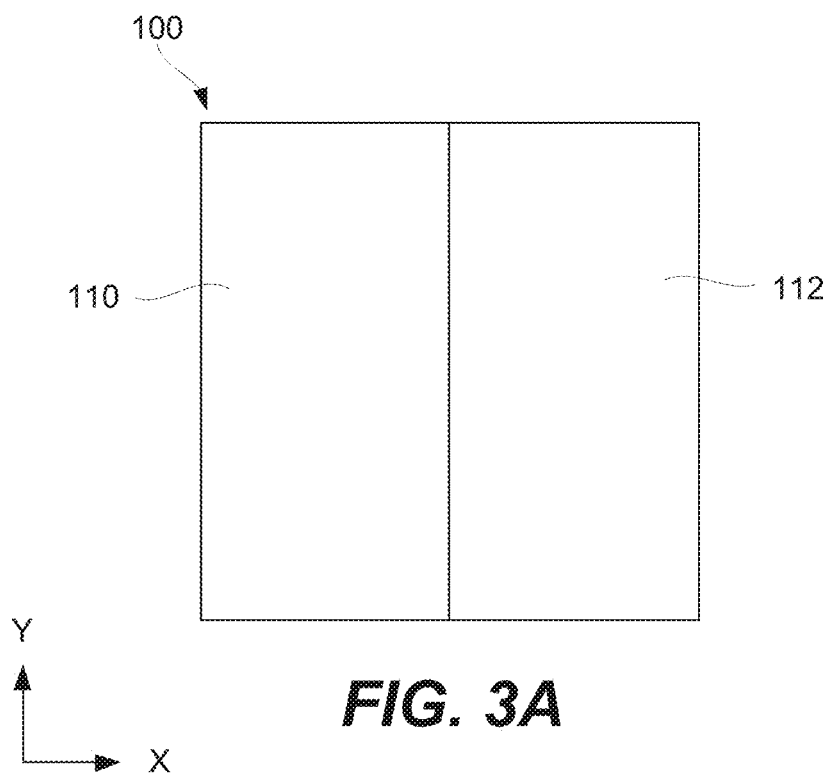
FIG. 3A illustrates a top schematic view of a component prior to creating any welded seams, in accordance with some embodiments.
Figure 3B:
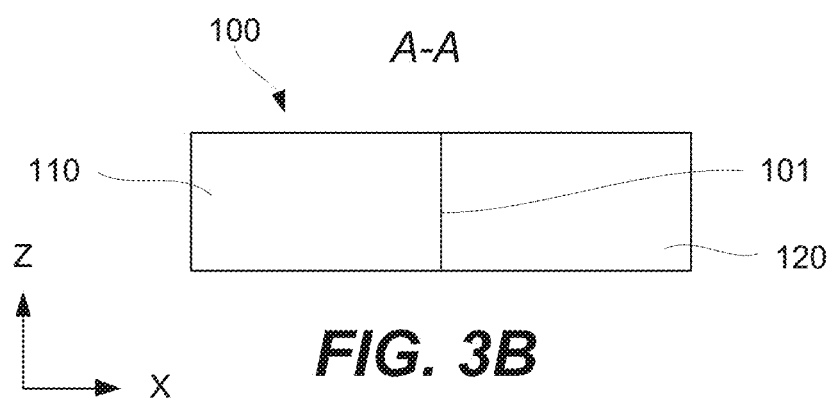
FIG. 3B illustrates a cross-sectional schematic view of the component shown in FIG. 3A, also prior to creating any welded seams, in accordance with some embodiments.

FIG. 2 is a process flowchart corresponding to method 200 of repairing hole 130 in first weld seam 120 of component 100. Different examples of component 100 are within the scope. For example, component 100 may comprise first part 110 and second part 112, as shown in FIGS. 3A and 3B. FIGS. 3A and 3B illustrate an example in which first part 110 and second part 112 form interface 101 along their smallest sides, which may be referred to as edges. In this example, a weld seam, once created, may extend between first part 110 and second part 112 and form a new interface between these parts. This example may be referred to as a butt joint.

Method 200 may comprise step of creating 210 first weld seam 120. This step may be also referred to as first weld seam creating step 210. First weld seam creating step 210 is an optional step. In some embodiments, method 200 may commence with first weld seam 120 already being present (e.g., created in another process).

Figure 4A:
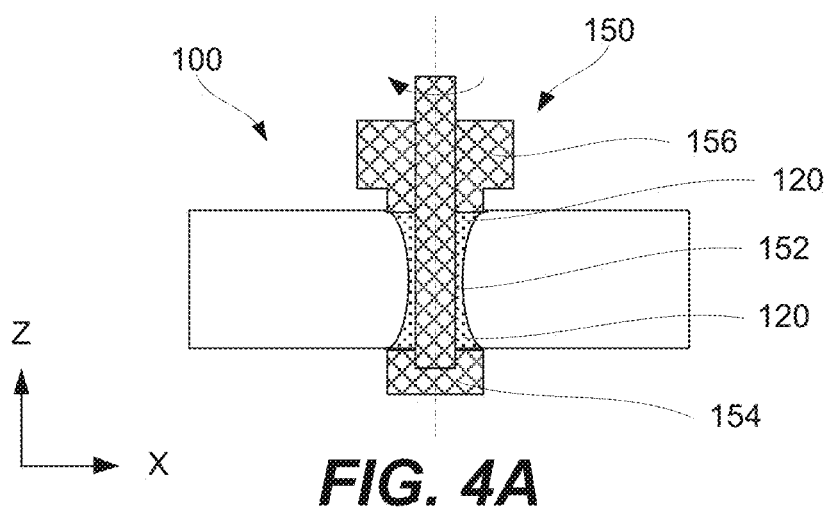
FIGS. 4A-4D illustrate cross-sectional schematic views of a component while creating a first weld seam in the component and creating a hole in the first weld seam, in accordance with some embodiments.
Figure 4B:
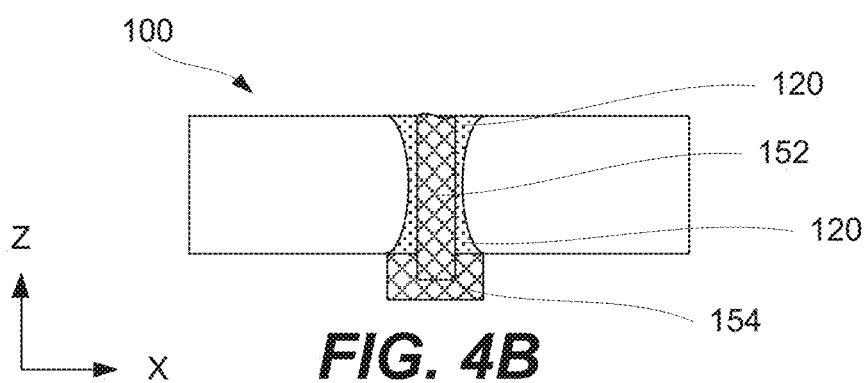
Figure 4C:
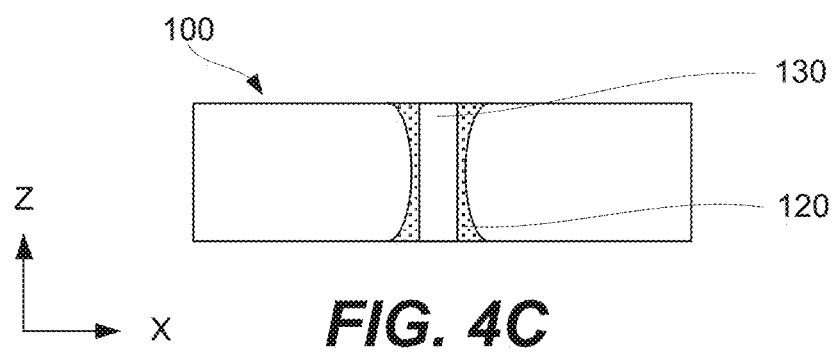
Figure 4D:
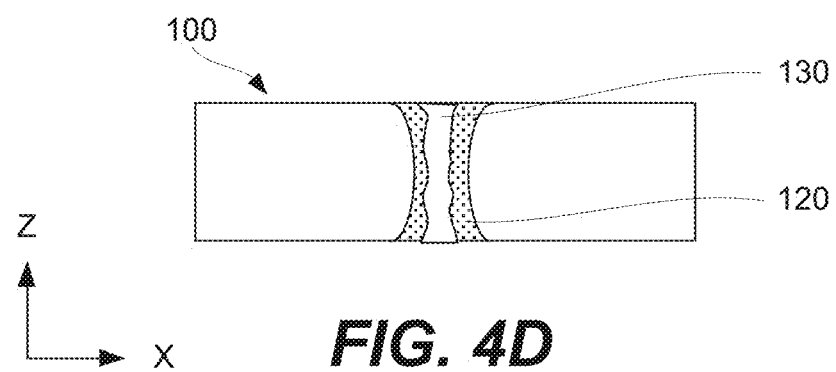
Figure 4E:
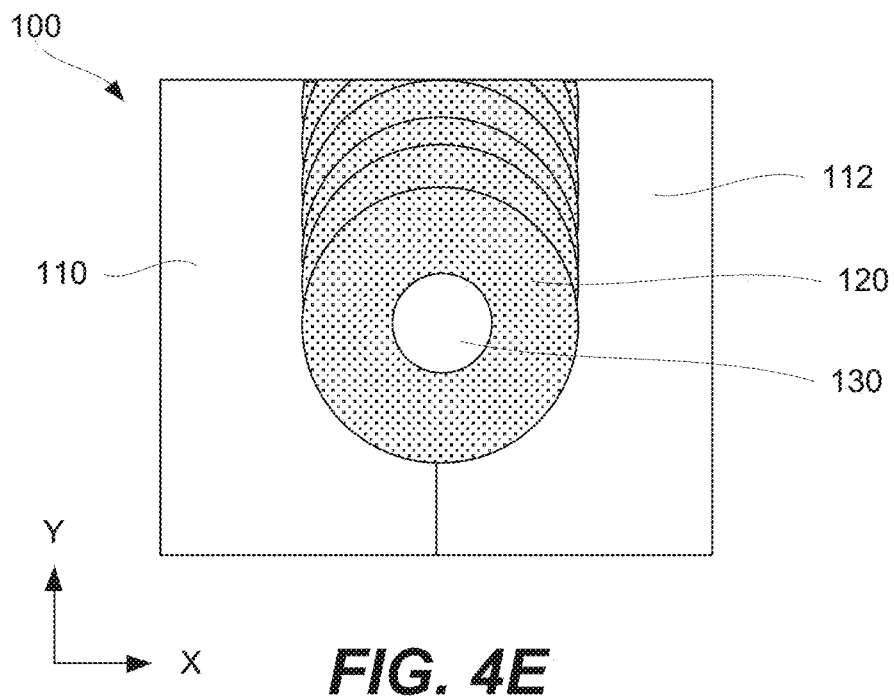
FIGS. 4E-4F illustrate top schematic views of different examples of the hole created in the first weld seam of the component, in accordance with some embodiments.
Figure 4F:
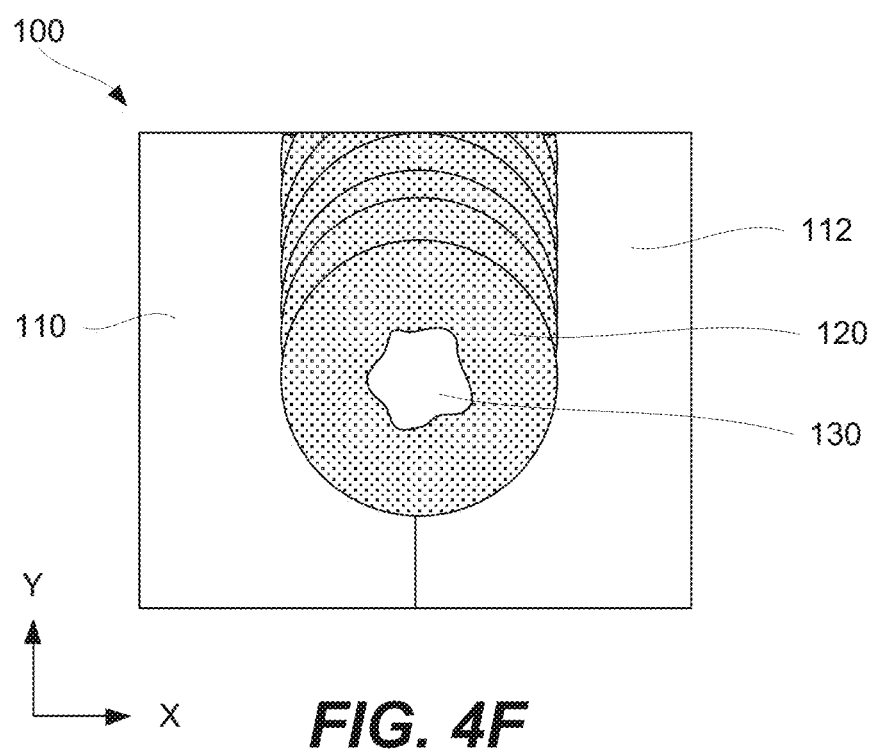

First weld seam 120 may be created using first BFSW tool 150 as, for example, shown in FIG. 4A. Various features of first BFSW tool 150 is described above. When creating first weld seam 120, pin of first BFSW tool 150 rotates while contacting component 100. This, in turn, generates heat, which softens the material of component 100. Furthermore, the rotation of pin 152 intermixes the softened material thereby creating first weld seam 120. Secondary shoulder 154 and main shoulder 156 of first BFSW tool 150 also contact component 100 causing heating and intermixing. Hence, the cross-sectional profile of weld seam 120 has a hyperboloid shape as, for example, shown in FIGS. 4A-4D.

Method 200 may comprise step of removing 215 pin 152 of first BFSW tool 150 from first weld seam 120. This step may be also referred to as pin removing step 215. The removal of pin 152 creates hole 130 in first weld seam 120 as, for example, shown in FIGS. 4C-4F. Pin removing step 215 is an optional step. In some embodiments, hole 130 may be already present in first weld seam 120 when method 200 is commenced.

In some embodiments, pin removing step 215 may be performed after completing first weld seam creating step 210. For example, pin 152 may be retained in component 100 as a result of breaking pin 152 from the rest of first BFSW tool 150 as, for example, schematically shown in FIG. 4B. Alternatively, pin 152 may be retained in component 100 as a result of abrupt stop of first weld seam creating step 210. In both examples, pin removing step 215 may involve extracting (e.g., pulling out, drilling out) pin 152 from first weld seam 120 without further creating first weld seam 120.

The profile of hole 130 may depend on the nature of pin removing step 215. Different profiles of hole 130 are illustrated in FIGS. 4C-4F. In some embodiments, hole 130 may have a cylindrical shape as, for example, shown in FIGS. 4C and 4E. Alternatively, when pin 152 breaks from the rest of first BFSW tool 150, hole 130 may be distorted as, for example, shown in FIGS. 4D and 4F.

Figure 5A:
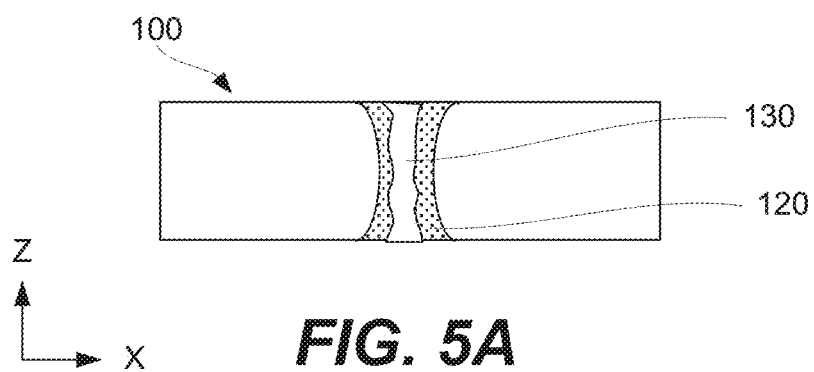
FIGS. 5A-5C illustrate cross-sectional schematic views of the hole in the first weld seam of the hole at different stages of changing one or more parameters of the hole, in accordance with some embodiments.
Figure 5B:
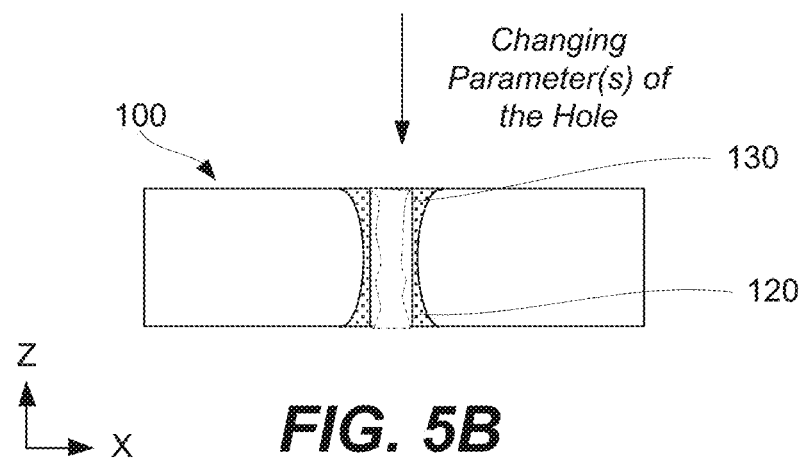
Figure 5C:
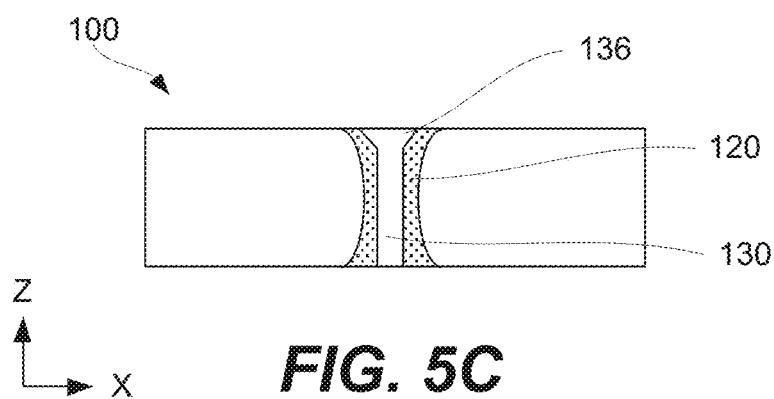

In some embodiments, method 200 further comprises step of changing 220 one or more parameters of hole 130, which may be also referred to as hole changing step 220. Hole changing step 220 is an optional step. Some examples of these parameters comprise the diameter of hole 130, the shape of hole 130, and the height of hole 130. For example, hole 130 may have an irregular shape prior to hole changing step 220. In this example, hole 130 may be drilled out to a cylindrical shape, as schematically shown in FIGS. 5A and 5B. As such, hole changing step 220 may comprise step of drilling 222. The diameter of hole 130 may be also increased during the drilling. If the diameter of hole 130 is increased beyond the boundaries of first weld seam 120, then second weld seam 122 (created during later operations described below) may be performed using a different BFSW tool or, more specifically, a BFSW tool with a larger pin diameter than first BFSW tool 150. In the same or other embodiments, hole changing step 220 comprises step of creating 224 at least one countersink 136 at one end of hole 130 as, for example, schematically shown in FIG. 5C.

Method 200 comprises step of inserting 230 plug 140 into hole 130, which may be also referred to as plug inserting step 230. For example, plug 140 may be pressed into hole 130 and may have an interference fit to minimize voids between plug 140 and component 100. The material of plug 140 may be the same or substantially similar to the material of component 100 to ensure material uniformity when the plug is later consumed. For the purposes of this disclosure, the term substantially similar is referred to material composition varying less than 10%.

Figure 6A:
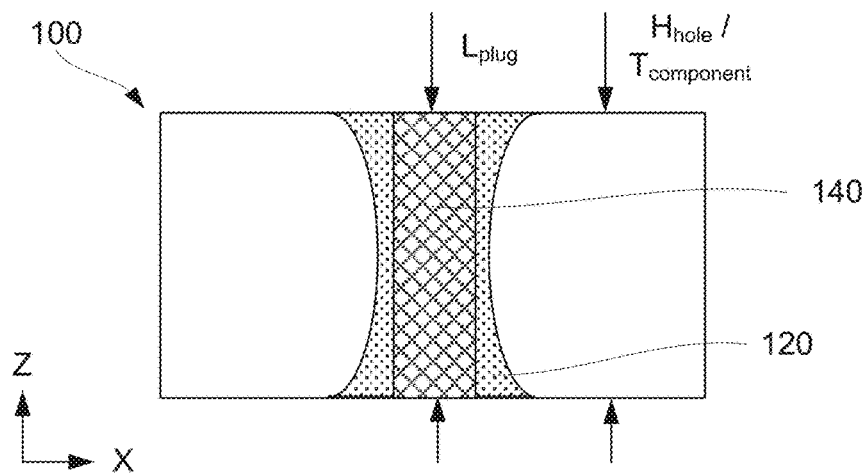
FIGS. 6A-6C illustrate cross-sectional schematic views of the component with different examples of a plug inserted into the hole in the first weld seam of the component, in accordance with some embodiments.

During plug inserting step 230, the length ($L_{plug}$) of plug 140 may be equal or greater than the height ($H_{hole}$) of hole 130. FIG. 6A illustrates an example when the length of plug 140 is equal to the height of hole 130. This example may be used when the shape and size of plug 140 closely corresponds to the shape and size of hole 130. In other words, when no voids are present between plug 140 and component 100, additional material of plug 140 is not needed to fill these voids.

Figure 6B:
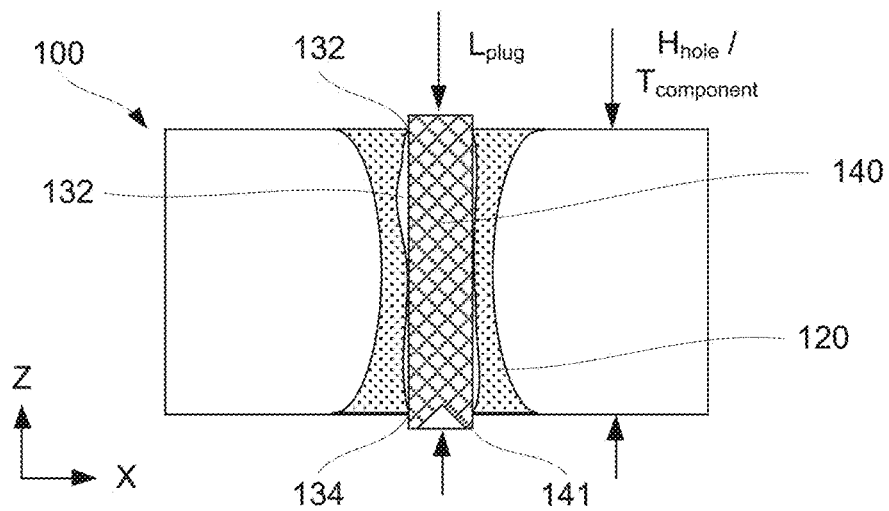
Figure 6C:
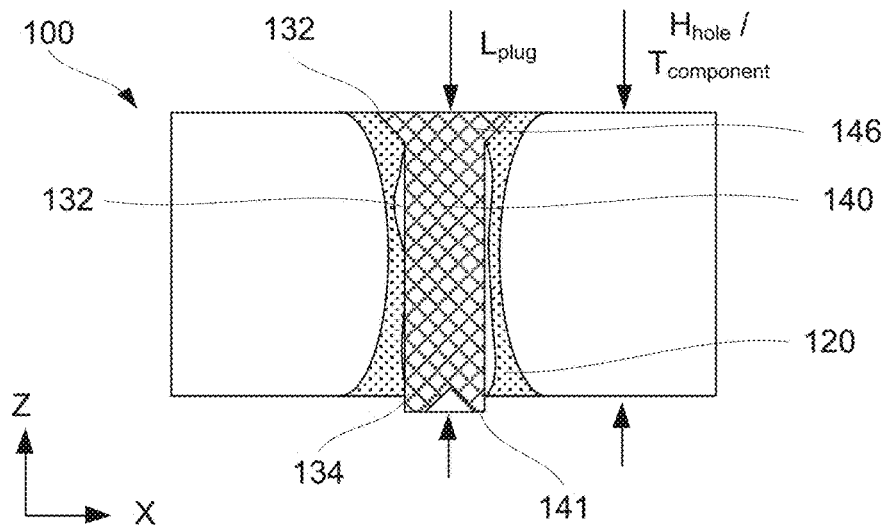

FIGS. 6B and 6C illustrate examples when the length ($L_{plug}$) of plug 140 is greater than the height ($H_{hole}$) of hole 130. This example may be used when the shape and size of plug 140 differs from the shape and size of hole 130 and voids 132 may be present between plug 140 and component 100. Portion 141 of plug 140 extending outside of hole 130 may be used to fill these voids 132 while reshaping plug 140 and/or creating second weld seam 122, which consumes plug 140. In general, the volume of plug 140 may be substantially the same as the volume of hole 130. As such, when plug 140 is later consumed to create second weld seam 122, each surface of second weld seam 122 may be coplanar with a corresponding side of component 100.

In some embodiments, prior to reshaping plug 140, plug 140 may comprise plug head 146 as, for example, shown in FIG. 6C. A specific example of such plug 140 is a rivet. Plug head 146 may fit into countersink 136 at one end of hole 130 and, in some embodiments, may not extend above the surface of component 100. In other words, plug head 146 may be flush with the surface. Alternatively, plug head 146 may extend above the surface. Extending portion 141 may be used to compensate for voids between plug 140 and component 100 inside hole 130. Thus, in the example embodiment, the volume of extending portion 141 is selected to be substantially the same as a volume of void 132 defined between the surface of the 130 and the exterior surface of plug 140.

Figure 7A:
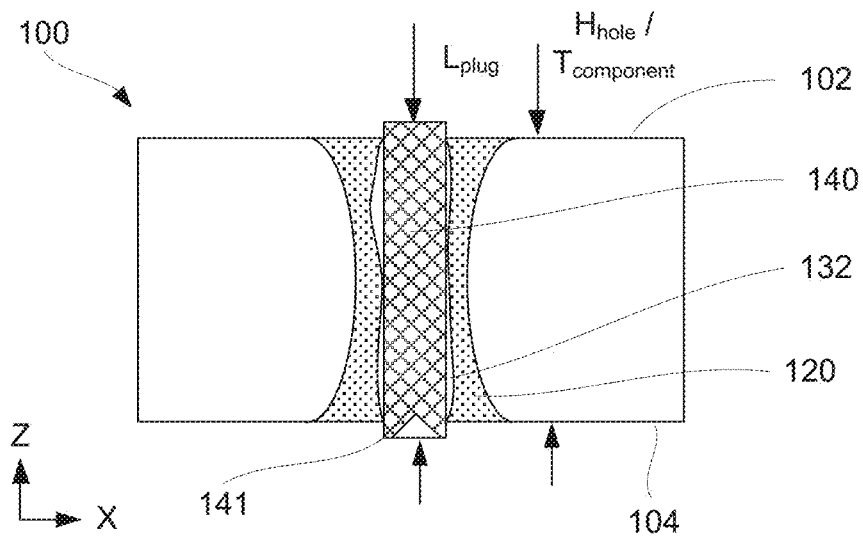
FIGS. 7A-7C illustrate cross-sectional schematic views of the component at different stages of reshaping the plug inserted into the hole in the first weld seam of the component, in accordance with some embodiments.
Figure 7B:
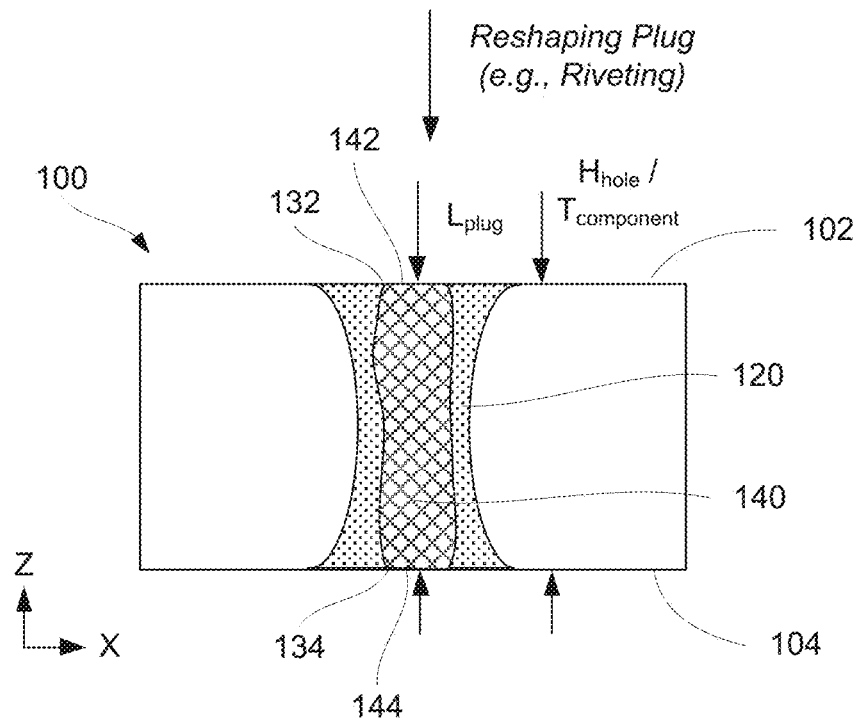

Method 200 comprises step of reshaping 240 plug 140, which may be also referred to as plug reshaping step 240. Plug reshaping step 240 is performed while plug 140 is inserted into hole 130. Plug reshaping step 240 secures plug 140 inside hole 130 and is schematically shown in FIGS. 7A and 7B. Securing plug 140 ensures that plug 140 is retained at its position while creating second weld seam 122 since plug 140 is relied on to fill hole 130. Furthermore, plug 140 experiences very high forces when the second weld seam 122 is created. Finally, hole 130 containing plug 140 is typically a through hole due to a bobbin friction stir welding technique used to create first weld seam 120.

In some embodiments plug reshaping step 240 comprises one of the following examples: step of squeeze plugging 242 or step of percussion plugging 244. The selection may depend on the material of plug 140, the shape and size of plug 140, tolerances, processing speeds, and other factors.

After plug reshaping step 240, length of plug 40 may be substantially identical as height of hole 130 as, for example, shown in FIG. 7B. For purposes of this disclosure, substantially identical lengths are defined as lengths having difference of less than about 10%. Furthermore, as shown in FIG. 7B, ends 142 and of plug 140 may coincide with corresponding surfaces 102 and 104 of component 100. In other words, the ends of plug 140 may be flush with these surfaces.

In some embodiments, after plug reshaping step 240, hole 130 is substantially filled with plug 140. As such, hole 130 may be substantially free from voids and the entire volume of hole is filled with plug 140. For purposes of this disclosure, substantially filled or substantially free from voids is defined as voids occupying less than 10% of the volume of hole 130

Specifically, any voids that may have existed before plug reshaping step 240 may be removed and displaced by deformation of plug 140.

Figure 7C:
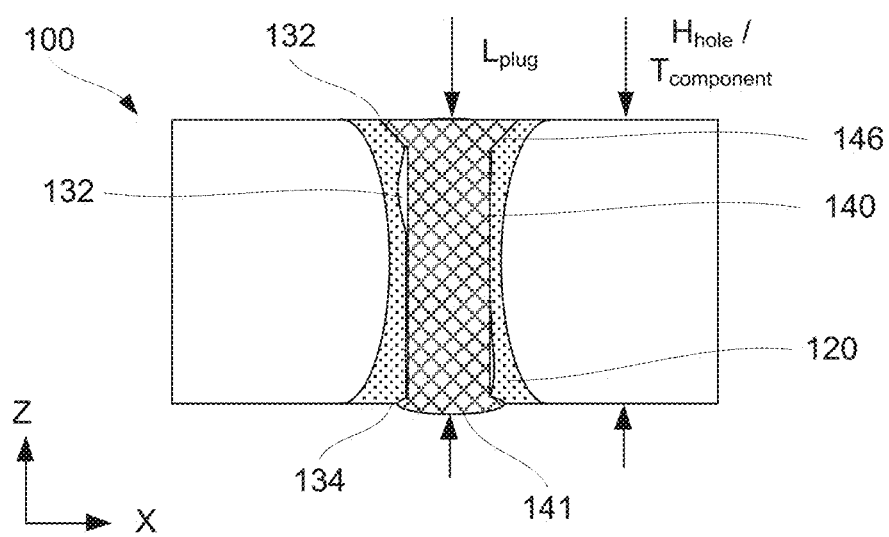

Alternatively, after plug reshaping step 240, hole 130 may still comprise one or more voids 132 as, for example, shown in FIG. 7C. These voids 132 may be removed later, while creating second weld seam 122. In these embodiments, one or more portions 141 of plug 140 may protrudes outside of hole 130 even after plug reshaping step 240. These protruding portions 141 may be used to compensate for, or fill the voids 132, during the BFSW process.

Method 200 comprises step of creating 250 second weld seam 122, which may be also referred to as second weld seam creating step 250 and may be performed using second BFSW tool 160. Second bobbin friction stir welding tool 160 and first bobbin friction stir welding tool 150 or a tool identical to second BFSW tool 160. In other words, the same tool may be used as first bobbin friction stir welding tool 150 and second BFSW tool 160. These examples may be used when the diameter of hole 130 is less than the corresponding width of a weld seam (e.g., first weld seam 120) created by the tool. In other words, the pin diameter and the shoulder diameters of the tool used during second weld seam creating step 250 are selected to ensure that entire plug 140 is consumed in this step. The width of the weld seam may vary with the thickness of component 100. Likewise, the diameter of hole 130 (and the diameter of plug 140) may vary with the thickness of component 100, e.g., hole may have countersink 136.

Alternatively, second BFSW tool 160 may be different from first bobbin friction stir welding tool 150. For example, pin 162 of BFSW tool 160 may have a larger diameter than pin 152 of first bobbin friction stir welding tool 150. The larger diameter pin may be used if hole 130 was enlarged after extracting pin 152 of first bobbin friction stir welding tool 150, e.g., to reshape hole 130. Furthermore, the larger diameter pin may be used to ensure that plug 140 is fully consumed and that the material of plug 140 is thoroughly mixed with the material of component 100.

Figure 8A:
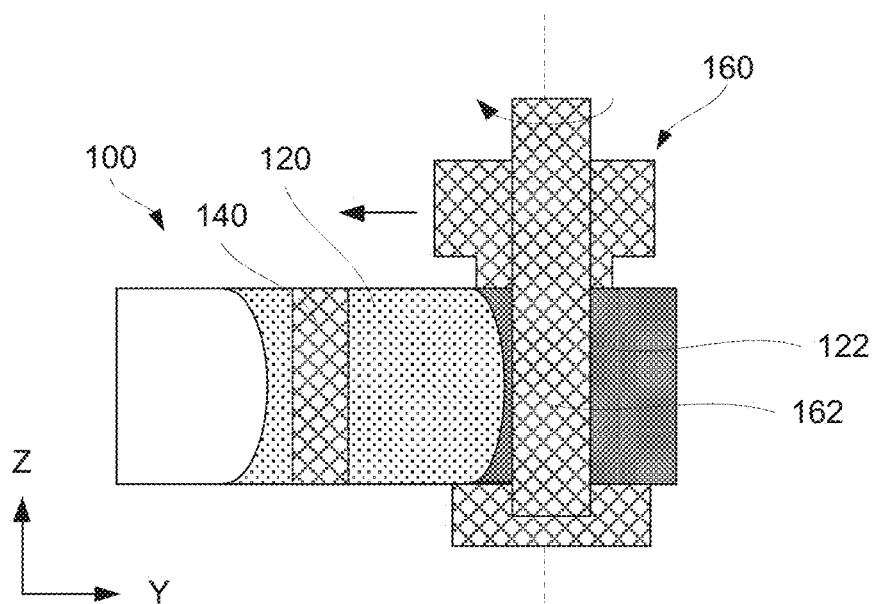
FIGS. 8A and 8B illustrate a cross-sectional schematic view of a second bobbin friction stir welding tool creating a second weld seam in the component and consuming the plug inserted into the hole, in accordance with some embodiments.
Figure 8B:
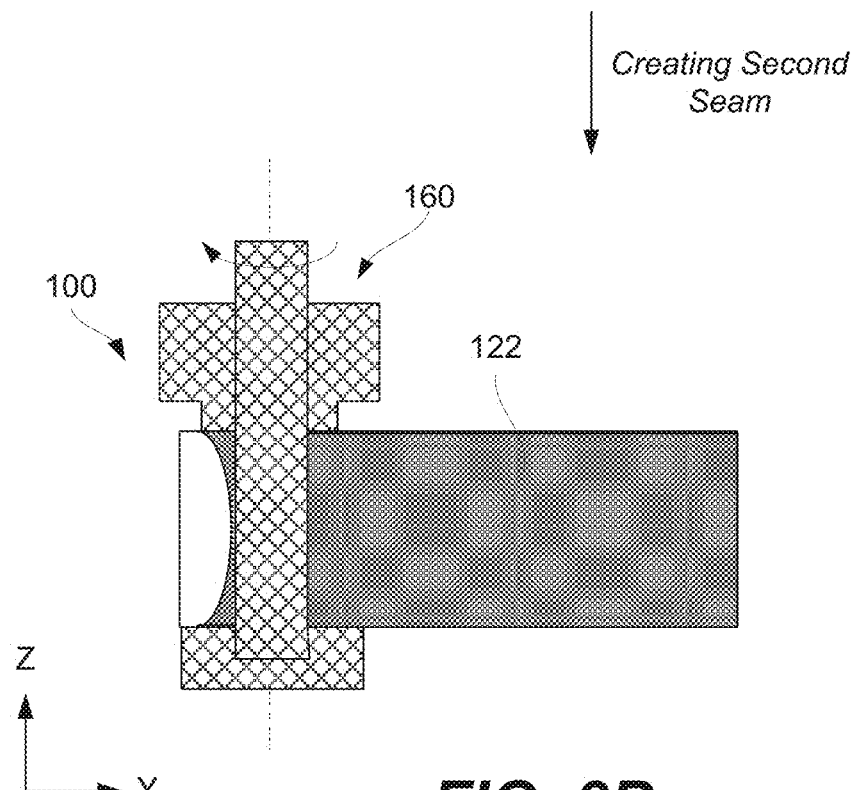
Figure 8C:
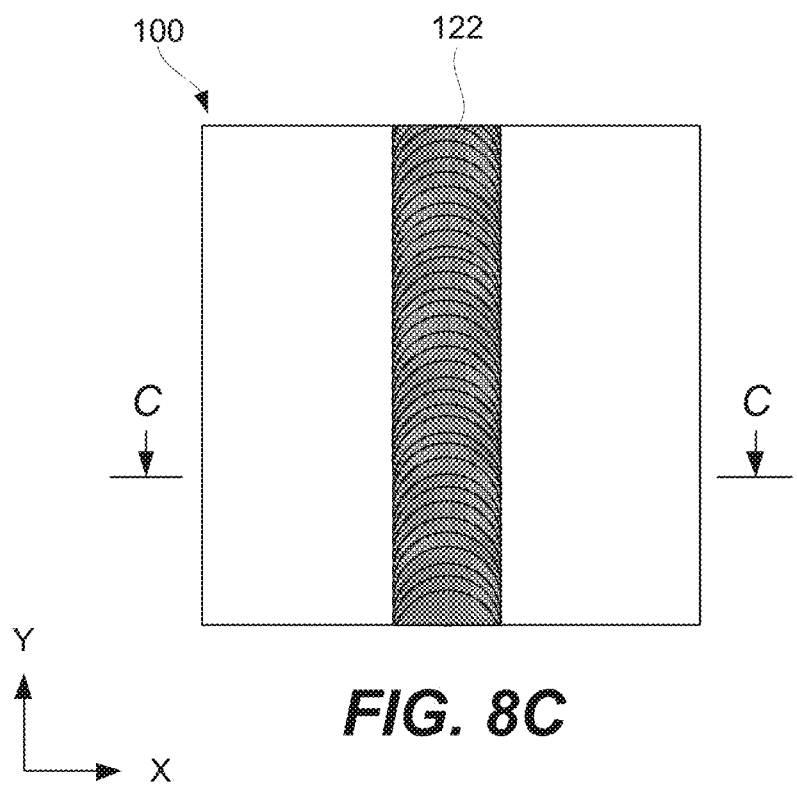
FIG. 8C illustrates a top schematic view of a second weld seam, in accordance with some embodiments.
Figure 8D:
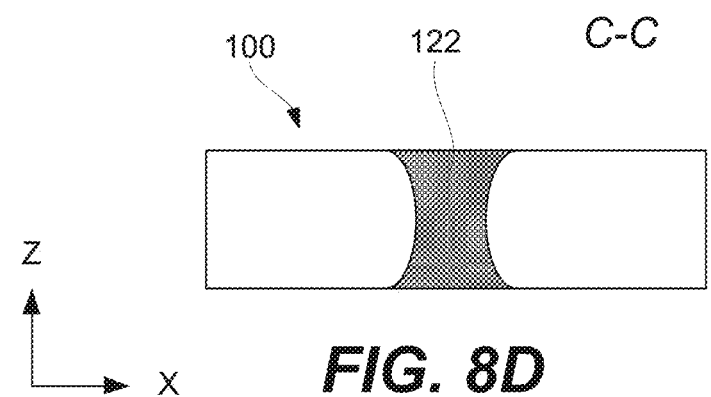
FIGS. 8D and 8E illustrate a cross-sectional schematic view of the second weld seam, in accordance with some embodiments.
Figure 8E:
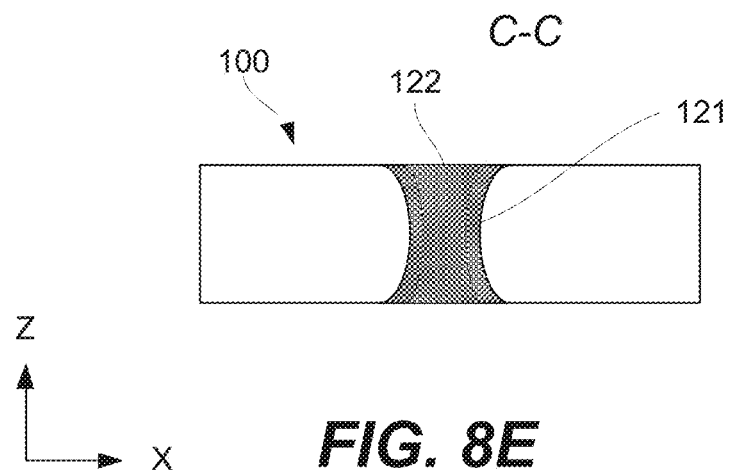
Figure 8F:
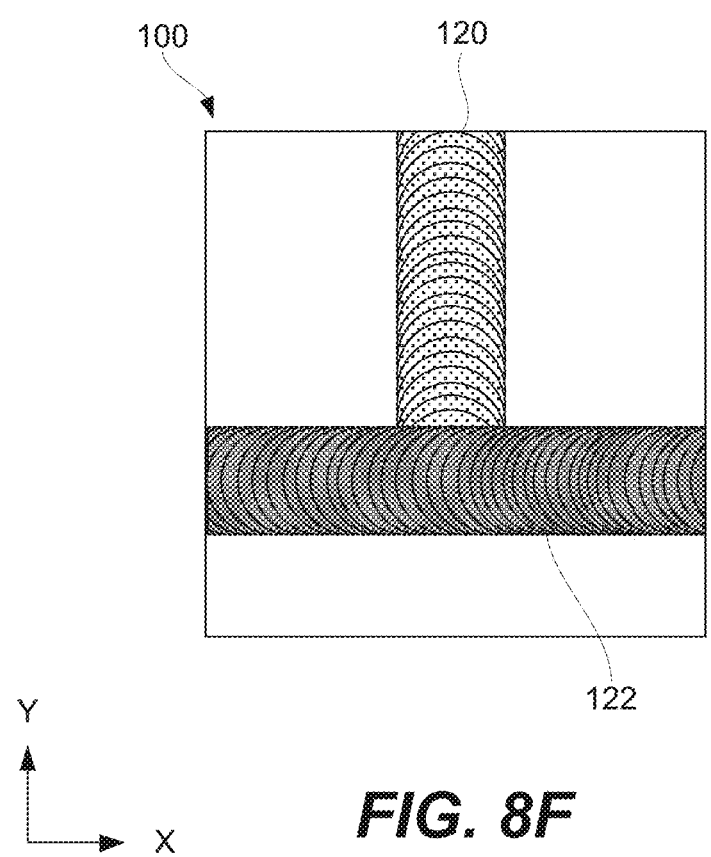
FIG. 8F illustrates a top schematic view of the second weld seam relative to the first weld seam, in accordance with some embodiments.

To ensure that plug 140 is fully consumed, second weld seam 122 passes through plug 140 secured in hole 130. For example, first weld seam 120 and second weld seam 122 are collinear. In this example, first weld seam 120 may be consumed by second weld seam 122 as, for example, schematically shown in FIG. 8C. FIG. 8D is schematic cross-sectional representation of second weld seam 122. FIG. 8D is yet another schematic cross-sectional representation of second weld seam 122 illustrating outline 121 of first weld seam 120. In this example, pin 162 of second BFSW tool 160 may have a larger diameter than pin 152 of first bobbin friction stir welding tool 150

In some embodiments, first weld seam 120 and second weld seam 122 are not collinear. For example, second weld seam 122 may intersect first weld seam 120 at location of plug 140 as, for example, schematically shown in 8F.

Aircraft Examples

While the systems, apparatus, and methods disclosed above have been described with reference to airplanes and the aerospace industry, it will be appreciated that the embodiments disclosed herein may be applied to any other context as well, such as automotive, railroad, and other mechanical and vehicular contexts.

Figure 9:
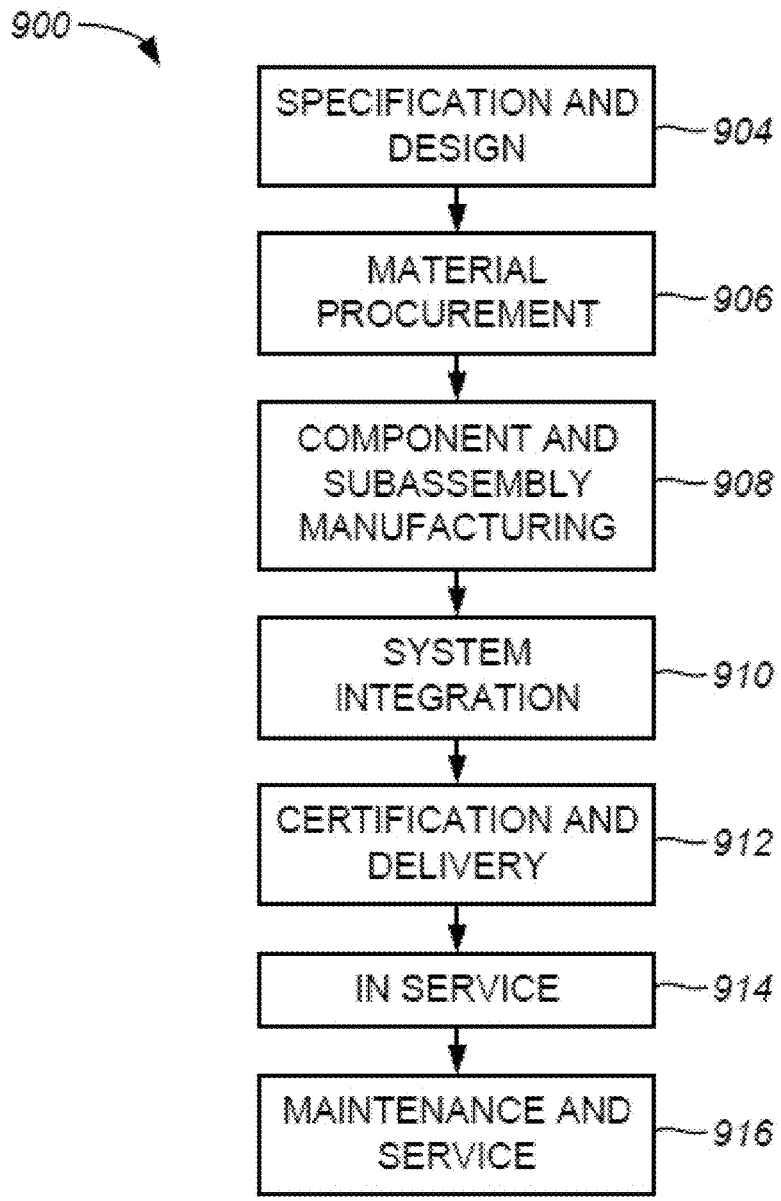
FIG. 9 illustrates a flow chart of an example of an airplane production and service methodology, in accordance with some embodiments.

Accordingly, embodiments of the disclosure may be described in the context of an airplane manufacturing and service method 900 as shown in FIG. 9 and an airplane 902 as shown in FIG. 9. During pre-production, illustrative method 900 may include the specification and design 904 of the airplane 902 and material procurement 906. During production, component and subassembly manufacturing 908 and system integration 910 of the airplane 902 takes place. Thereafter, the airplane 902 may go through certification and delivery 912 in order to be placed in service 914. While in service by a customer, the airplane 902 is scheduled for routine maintenance and service 916 (which may also include modification, reconfiguration, refurbishment, and so on).

Each of the processes of method 900 may be performed or carried out by a system integrator, a third party, and/or an operator (e.g., a customer). For the purposes of this description, a system integrator may include without limitation any number of airplane manufacturers and major-system subcontractors; a third party may include without limitation any number of venders, subcontractors, and suppliers; and an operator may be an airline, leasing company, military entity, service organization, and so on.

Figure 10:
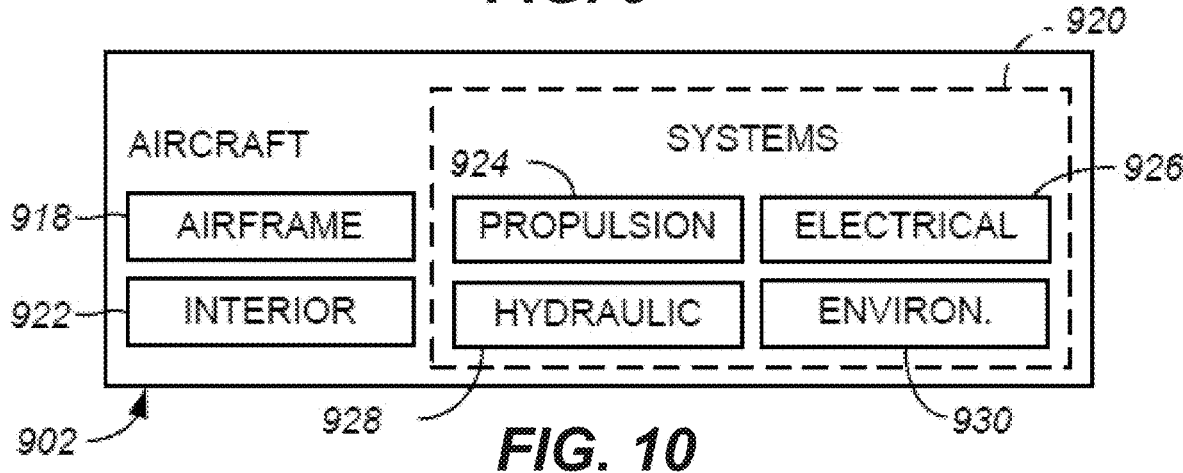
FIG. 10 illustrates a block diagram of an example of an airplane, in accordance with some embodiments.

As shown in FIG. 10, the airplane 902 produced by illustrative method 900 may include an airframe 918 with a plurality of systems 920, and an interior 922. Examples of high-level systems 920 include one or more of a propulsion system 924, an electrical system 926, a hydraulic system 928, and an environmental system 930. Any number of other systems may be included. Although an aerospace example is shown, the principles of the embodiments disclosed herein may be applied to other industries, such as the automotive industry.

Apparatus and methods embodied herein may be employed during any one or more of the stages of the production and service method 800. For example, components or subassemblies corresponding to production process 808 may be fabricated or manufactured in a manner similar to components or subassemblies produced while the airplane 802 is in service. Also, one or more apparatus embodiments, method embodiments, or a combination thereof may be utilized during the production process 808 and 810, for example, by expediting assembly of or reducing the cost of an airplane 802. Similarly, one or more of apparatus embodiments, method embodiments, or a combination thereof may be utilized while the airplane 802 is in service, for example and without limitation, to maintenance and service 816.

Although the foregoing concepts have been described in some detail for purposes of clarity of understanding, it will be apparent that certain changes and modifications may be practiced within the scope of the appended claims. It should be noted that there are many alternative ways of implementing the processes, systems, and apparatus. Accordingly, the present examples are to be considered as illustrative and not restrictive.

CONCLUSION

Illustrative, non-exclusive examples of inventive features according to present disclosure are described in following enumerated paragraphs:

A1. Method 200 of repairing hole 130 in first weld seam 120 of component 100, hole 130 created by first bobbin friction stir welding tool 150, method 200 comprising:
step of inserting 230 plug 140 into hole 130 of first weld seam 120, wherein:
the length of plug 140 is equal or greater than the height of hole 130, and
hole 130 is a through hole when inserting plug 140;
step of reshaping 240 plug 140 while plug 140 is inserted into hole 130,
wherein step of reshaping 240 plug 140 secures plug 140 inside hole 130; and
step of creating 250 second weld seam 122 using second bobbin friction stir welding tool 160, wherein:
second weld seam 122 passes through plug 140 secured in hole 130, and
plug 140 is consumed during step of creating 250 second weld seam 122.

A2. Method 200 of paragraph A1, further comprising step of removing 215 pin 152 of first bobbin friction stir welding tool 150 from first weld seam 120, thereby creating hole 130 in first weld seam 120.

A3. Method 200 of paragraphs A1-A2, further comprising step of creating 210 first weld seam 120 using first bobbin friction stir welding tool 150.

A4. Method 200 of paragraph A3, wherein step of removing 215 pin 152 from component 100 is performed after step of creating 210 first weld seam 120.

A5. method 200 of paragraph A4, wherein pin 152 is broken of first bobbin friction stir welding tool 150 and retained in component 100 after step of creating 210 first weld seam 120.

A6. Method 200 of paragraph A5, wherein pin 152 of first bobbin friction stir welding tool 150 is retained in component 100 after step of creating 210 first weld seam 120 is completed.

A7. Method 200 of paragraph A3, wherein step of removing 215 pin 152 from component 100 is part of step of creating 210 first weld seam 120.

A8. Method 200 of paragraphs A1-A7, wherein hole 130 in first weld seam 120 has cylindrical shape.

A9. Method 200 of paragraphs A1-A7, wherein hole 130 in first weld seam 120 has an irregular shape.

A10. Method 200 of paragraphs A1-A9, further comprising, prior to step of inserting 230 plug 140 into hole 130, step of changing 220 one or more parameters of hole 130, one or more parameters comprising at least one of diameter of hole 130, shape of hole 130, and height of hole 130.

A11. Method 200 of paragraph A10, wherein the one or more parameters of hole 130 comprise at least one of diameter of hole 130, shape of hole 130, and height of hole 130.

A12. Method 200 of paragraph A10, wherein step of changing 220 one or more parameters of hole 130 comprises step of drilling 222.

A13. Method 200 of paragraph A10, wherein step of changing 220 one or more parameters of hole 130 comprises step of creating 224 at least one countersink 136 at one end of hole 130.

A14, method 200 of paragraphs A1-A13, wherein, prior to step of reshaping 240 plug 140, length of plug 140 is greater than height of hole 130.

A15. Method 200 of paragraphs A1-A14, wherein, prior to step of reshaping 240 plug 140, plug 140 extends above at least one of two ends of hole 130.

A16. Method 200 of paragraphs A1-A15, wherein, prior to reshaping plug 140, plug 140 extends above each of two ends of hole 130.

A17. Method 200 of paragraphs A1-A16, wherein volume of plug 140 and volume of hole 130 are substantially identical.

A18. Method 200 of paragraphs A1-A17, wherein material of plug 140 and material of component 100 creating hole 130 are substantially identical.

A19. Method 200 of paragraphs A1-A18, wherein, prior to reshaping plug 140, plug 140 comprises plug head 146.

A20. Method 200 of paragraphs A1-A19, wherein step of reshaping 240 plug 140 comprises one of step of squeeze plugging 242 or step of percussion plugging 244.

A21. Method 200 of paragraphs A1-A20, wherein, after step of reshaping 240 plug 140, length of plug 140 is substantially identical as height of hole 130.

A22. Method 200 of paragraphs A1-A21, wherein, after step of reshaping 240 plug 140, ends of plug 140 coincide with corresponding surfaces of component 100.

A23. Method 200 of paragraphs A1-A22, wherein, after step of reshaping 240 plug 140, hole 130 is substantially filled with plug 140.

A24. Method 200 of paragraphs A1-A23, wherein: after step of reshaping 240 plug 140, hole 130 comprises one or more voids 132, and the one or more voids 132 are removed during step of creating 250 second weld seam 122.

A25. Method 200 of paragraphs A1-A24, wherein, after step of reshaping 240 plug 140, portion 141 of plug 140 protrudes outside of hole 130.

A26. Method 200 of paragraphs A1-A25, wherein the diameter of pin 162 of second bobbin friction stir welding tool 160 is substantially similar to the diameter of pin 152 of first bobbin friction stir welding tool 150.

A27. Method 200 of paragraphs A1-A26, wherein second bobbin friction stir welding tool 160 is first bobbin friction stir welding tool 150.

A28. Method 200 of paragraphs A1-A26, wherein second bobbin friction stir welding tool 160 is different from first bobbin friction stir welding tool 150.

A29. Method 200 of paragraph A28, wherein the diameter of pin 162 of second bobbin friction stir welding tool 160 is greater than the diameter of pin 152 of first bobbin friction stir welding tool 150.

A30. Method 200 of paragraphs A1-A29, wherein first weld seam 120 and second weld seam 122 are collinear.

A31. Method 200 of paragraphs A1-A30, wherein: the first weld seam 120 and second weld seam 122 are not collinear; and the second weld seam 122 intersects first weld seam 120 at location of plug 140.

A32. Method 200 of paragraphs A1-A31, wherein component 100 comprises first part 110 and second part 112, and wherein first weld seam 120 extends between first part 110 and second part 112.

A33. Method 200 of paragraph A32, wherein first weld seam 120 is a butt joint extending between first part 110 and second part 112.

A34. Method 200 of paragraphs A1-A33, wherein component 100 is an aircraft component.

B1. Method 200 of repairing hole 130 in first weld seam 120 of component 100, hole 130 created using a bobbin friction stir welding technique, method 200 comprising:
step of inserting 230 plug 140 into hole 130 of first weld seam 120, wherein:
the length of plug 140 is equal or greater than the height of hole 130, and
the hole 130 is a through hole when inserting plug 140;
step of reshaping 240 plug 140, while plug 140 is inserted into hole 130, wherein step of reshaping 240 plug 140 secures plug 140 inside hole 130; and
step of creating 250 second weld seam 122 using the bobbin friction stir welding technique, wherein:
second weld seam 122 passes through plug 140 secured in hole 130, and
the plug 140 is consumed during step of creating 250 second weld seam 122.

B2. Method 200 of paragraph B1, further comprising first weld seam 120 using first pin 152, wherein second weld seam 122 is created using second pin 162, different from first pin 152, and wherein the diameter of second pin 162 is greater than the diameter of first pin 152.

B3. Method 200 of paragraph B1, further comprising first weld seam 120 using first pin 152, wherein second weld seam 122 is created using first pin 152.

B4. Method 200 of paragraphs B1-B3, further comprising step of removing 215 pin 152 from first weld seam 120, thereby creating hole 130 in first weld seam 120.

B5. Method 200 of paragraphs B1-B4, further comprising step of creating 210 first weld seam 120 using the bobbin friction stir welding technique.

B6. Method 200 of paragraphs B1-B5, wherein step of removing 215 pin 152 from component 100 is performed after step of creating 210 first weld seam 120.

B7. Method 200 of paragraph B6, wherein pin 152 is broken and retained in component 100 after step of creating 210 first weld seam 120.

B8. Method 200 of paragraph B7, wherein pin 152 is retained in component 100 after step of creating 210 first weld seam 120 is completed.

B9. Method 200 of paragraph B6, wherein step of removing 215 pin 152 from component 100 is part of step of creating 210 first weld seam 120.

B10. Method 200 of paragraphs B1-B9, hole 130 in first weld seam 120 has cylindrical shape.

B11. Method 200 of paragraphs B1-B9, wherein hole 130 in first weld seam 120 has an irregular shape.

B12. Method 200 of paragraphs B1-B11, further comprising, prior to step of inserting 230 plug 140 into hole 130, step of changing 220 one or more parameters of hole 130, one or more parameters comprising at least one of diameter of hole 130, shape of hole 130, and height of hole 130.

B13. Method 200 of paragraph B12, wherein the one or more parameters of hole 130 comprise at least one of diameter of hole 130, shape of hole 130, and height of hole 130.

B14. Method 200 of paragraph B12, wherein step of changing 220 one or more parameters of hole 130 comprises step of drilling 222.

B15. method 200 of paragraph B12, wherein step of changing 220 one or more parameters of hole 130 comprises step of creating 224 at least one countersink 136 at one end of hole 130.

B16. method 200 of paragraphs B1-A15, wherein, prior to step of reshaping 240 plug 140, length of plug 140 is greater than height of hole 130.

B17. Method 200 of paragraphs B1-B16, wherein, prior to step of reshaping 240 plug 140, plug 140 extends above at least one of two ends of hole 130.

B18. Method 200 of paragraphs B1-B17, wherein, prior to reshaping plug 140, plug 140 extends above each of two ends of hole 130.

B19. Method 200 of paragraphs B1-B18, wherein volume of plug 140 and volume of hole 130 are substantially identical.

B20. Method 200 of paragraphs B1-B19, wherein material of plug 140 and material of component 100 creating hole 130 are substantially identical.

B21. Method 200 of paragraphs B1-B20, wherein, prior to reshaping plug 140, plug 140 comprises plug head 146.

B22. Method 200 of paragraphs B1-B21, wherein step of reshaping 240 plug 140 comprises one of step of squeeze plugging 242 or step of percussion plugging 244.

B23. Method 200 of paragraphs B1-B22, wherein, after step of reshaping 240 plug 140, length of plug 140 is substantially identical as height of hole 130.

B24. Method 200 of paragraphs B1-B23, wherein, after step of reshaping 240 plug 140, ends of plug 140 coincide with corresponding surfaces of component 100.

B25. Method 200 of paragraphs B1-B24, wherein, after step of reshaping 240 plug 140, hole 130 is substantially filled with plug 140.

B26. Method 200 of paragraphs B1-B25, wherein: after step of reshaping 240 plug 140, hole 130 comprises one or more voids 132, and the one or more voids 132 are removed during step of creating 250 second weld seam 122.

B27. Method 200 of paragraphs B1-B26, wherein, after step of reshaping 240 plug 140, portion 141 of plug 140 protrudes outside of hole 130.

B28. Method 200 of paragraphs B1-A27, wherein first weld seam 120 and second weld seam 122 are collinear.

B29. Method 200 of paragraphs B1-B28, wherein: the first weld seam 120 and second weld seam 122 are not collinear; and the second weld seam 122 intersects first weld seam 120 at location of plug 140.

B30. Method 200 of paragraphs B1-B29, wherein component 100 comprises first part 110 and second part 112, and wherein first weld seam 120 extends between first part 110 and second part 112.

B31. Method 200 of paragraph B30, wherein first weld seam 120 is a butt joint extending between first part 110 and second part 112.

B32. Method 200 of paragraphs B1-B31, wherein component 100 is an aircraft component.

C1. Component 100 comprising:
first weld seam 120, created by first bobbin friction stir welding tool 150;
hole 130, disposed in first weld seam 120, created by removal of pin 152 of first bobbin friction stir welding tool 150 from first weld seam 120, wherein hole 130 is through hole;
plug 140, inserted into hole 130 in first weld seam 120, wherein:
plug 130 is secured inside hole 130 by reshaping of plug 130; and
plug 130 is configured to remain inside hole 130 while creating 250 second weld seam 122 using second bobbin friction stir welding tool 160 such that second weld seam 122 passes through plug 140 secured in hole 130 and such that plug 140 is consumed when second weld seam 122 is created.

C2. Component 100 of paragraph C1, wherein volume of plug 140 and volume of hole 130 are substantially identical.

C3. Component 100 of paragraphs C1-C2, wherein material of plug 140 and material of component 100 creating hole 130 are substantially identical.

C4. Component 100 of paragraphs C1-C3, wherein hole 130 in first weld seam 120 has a cylindrical shape.

C5. Component 100 of paragraphs C1-C3, wherein hole 130 in first weld seam 120 has an irregular shape.

C6. Component 100 of paragraphs C1-C5, wherein hole 130 comprises at least one countersink 136 at one end of hole 130.

C7. Component 100 of paragraphs C1-C6, wherein the length of plug 140 is substantially identical as height of hole 130.

C8. Component 100 of paragraphs C1-C7, wherein the ends of plug 140 coincide with corresponding surfaces of component 100.

C9. Component 100 of paragraphs C1-C8, wherein hole 130 is substantially filled with plug 140.

C10. Component 100 of paragraphs C1-C8, wherein hole 130 comprises one or more voids 132.

C11. Component 100 of paragraphs C1-C10, wherein component 100 comprises first part 110 and second part 112, and wherein first weld seam 120 extends between first part 110 and second part 112.

C12. Component 100 of paragraphs C1-C11, wherein first weld seam 120 is a butt joint extending between first part 110 and second part 112.

C13. Component 100 of paragraphs C1-C8, wherein component 100 is an aircraft component.

What is claimed is:

1. A method of repairing a hole in a first weld seam of a component, the hole created by a first bobbin friction stir welding tool, the method comprising:
inserting a plug into the hole of the first weld seam, wherein the hole is a through hole when inserting the plug; and
creating a second weld seam using a second bobbin friction stir welding tool, wherein the second weld seam passes through the plug secured in the hole, and the plug is consumed during the step of creating the second weld seam.

2. The method of claim 1, wherein a length of the plug is equal or greater than a height of the hole.

3. The method of claim 1, further comprising:
reshaping the plug, while the plug is inserted into the hole, to secure the plug inside the hole.

4. The method of claim 3, wherein, prior to the reshaping the plug, a length of the plug is greater than a height of the hole.

5. The method of claim 4, wherein, after the reshaping the plug, the length of the plug is substantially identical to the height of the hole.

6. The method of claim 3, wherein, prior to the reshaping the plug, the plug comprises a plug head.

7. The method of claim 3, wherein the reshaping the plug comprises squeeze plugging or percussion plugging.

8. The method of claim 1, further comprising:
removing a pin of the first bobbin friction stir welding tool from the first weld seam to create the hole in the first weld seam.

9. The method of claim 8, wherein the removing the pin is after the first weld seam is created.

10. The method of claim 9, further comprising:
creating the first weld seam.

11. The method of claim 1, wherein the hole in the first weld seam has a cylindrical shape or irregular shape.

12. The method of claim 1, further comprising:
prior to the inserting the plug, creating a countersink at one end of the hole and/or changing at least one of a diameter of the hole, a shape of the hole, and/or the height of the hole.

13. The method of claim 1, wherein a diameter of a pin of the second bobbin friction stir welding tool is greater than a diameter of a pin of the first bobbin friction stir welding tool.

14. A component comprising:
a first weld seam, created by a first bobbin friction stir welding tool;
a hole, disposed in the first weld seam, wherein the hole is a through hole; and
a plug, inserted into the hole in the first weld seam, wherein the plug is configured to remain inside the hole while creating a second weld seam using a second bobbin friction stir welding tool such that the second weld seam passes through the plug and such that the plug is consumed when the second weld seam is created.

15. The component of claim 14, wherein the hole is created by removal of a pin of the first bobbin friction stir welding tool from the first weld seam.

16. The component of claim 15, wherein a material of the plug and a material of the component creating the hole are substantially identical.

17. The component of claim 15, wherein the removal of the pin is after the first weld seam is created.

18. The component of claim 14, wherein the plug is secured inside the hole by reshaping of the plug.

19. The component of claim 14, wherein a length of the plug is equal or greater than a height of the hole.

20. The component of claim 14, wherein a volume of the plug and a volume of the hole are substantially identical.

\* \* \* \* \*